P. Miles,
Curtain Roller,
№ 16,741. Patented Mar. 3, 1857.
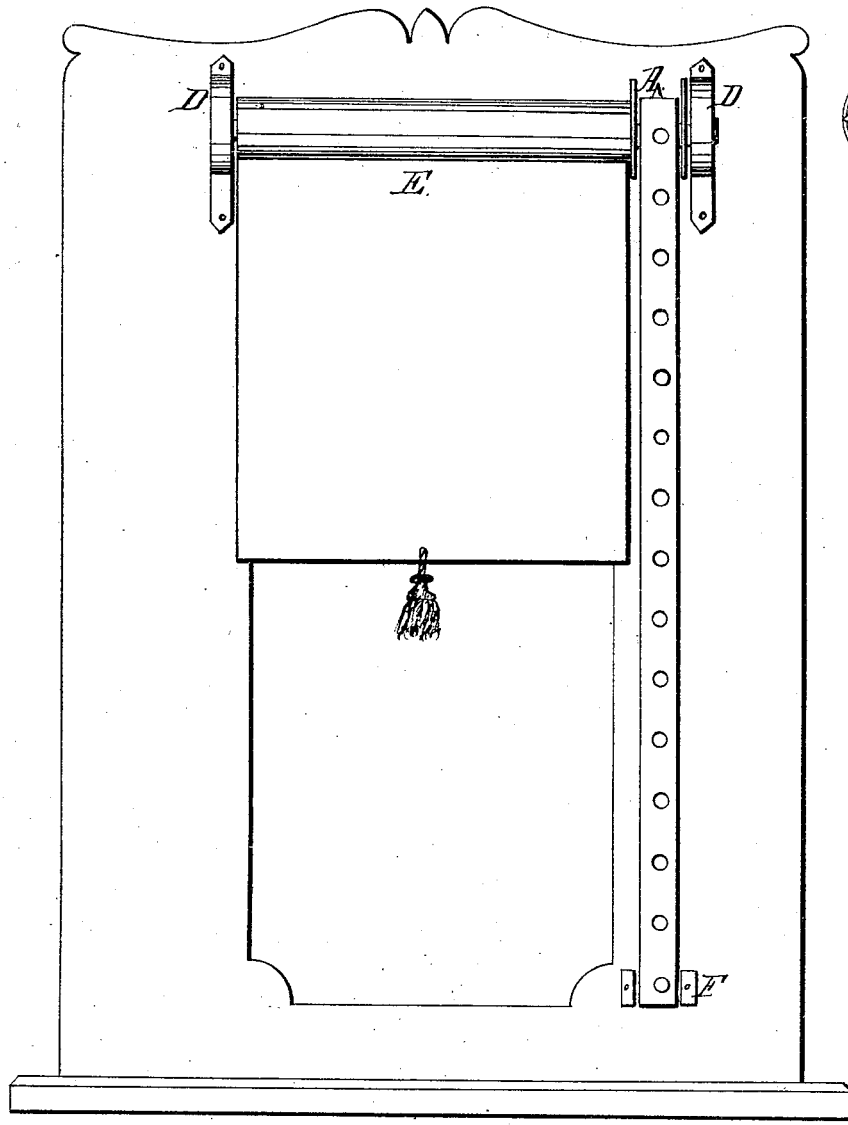
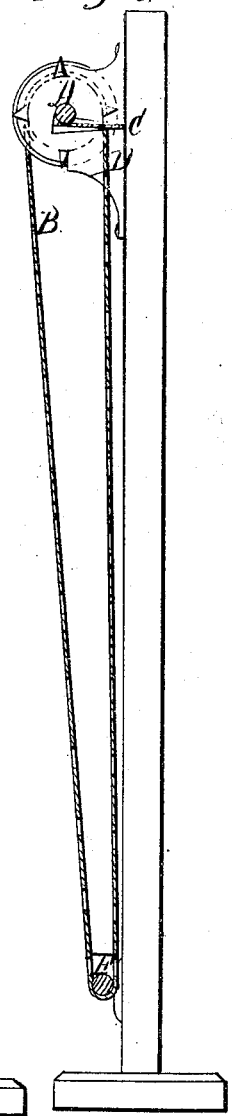
Inventor
Purchese Miles

UNITED STATES PATENT OFFICE.

PURCHES MILES, OF HARTFORD, CONNECTICUT.

CURTAIN-ROLLER.

Specification of Letters Patent No. 16,741, dated March 3, 1857.

*To all whom it may concern:*

Be it known that I, PURCHES MILES, of the city of Hartford, county of Hartford, and State of Connecticut, have invented a new and useful Improvement in the Method of Constructing Curtain-Fixtures; and I do hereby declare that the following is a correct description of the same, reference being had to the accompanying drawing and to the letters of reference marked thereon.

The nature of my invention consists in the combination of an endless running eyelet band, a toothed flanged pulley, and a relieving friction spring fitted to a roller curtain and constructed substantially in the manner herein set forth.

To enable others skilled in the art to make and use my invention, I will proceed to describe in substance its construction and operation.

The drawing Figure 1 is a front view of the roller, curtain, and fixtures. Fig. 2 is a side view of the same.

Letter A is the toothed flanged pulley.
B is the eyelet running band.
C is the friction spring.
D is the brackets.
E is the curtain.
F is the small roller for bottom part of band.

The roller curtain and brackets I construct in the usual mechanical way. The toothed pulley A I make at one end of the roller with projecting flanges or disks to guide the flat line or band when operating. In the center of the pulley A on its periphery I make pins or teeth of a conical shape, projecting a quarter of an inch, or thereabout, and fixed in at proper distances apart to pass into the eyelet holes of the operating flat band B when it revolves in the act of raising or lowering the curtain.

In curtains for ordinary windows the dimensions and descriptions of the various parts of the work may be about as follows: Diameter of the toothed wheel, two inches; height of flange above rim of wheel one quarter of an inch; length of teeth above periphery of wheel, three eighths of an inch; diameter of lower part of tooth three sixteenths of an inch; breadth of band half an inch; distance of teeth from each other one and a quarter inch; width of periphery of wheel between flanges half an inch.

The band B is composed of a firm flat pliable substance, either of woven material or otherwise, fitting into the periphery of the wheel between the flanges, in which band are inserted metallic eyelets at the proper distances and size to correspond with and fit in rotation upon the projecting teeth in the periphery of the pulley when revolving.

The friction spring C is made of flat spring metal formed to fit in the opening of the brackets D and securely fastened at the back:—this spring in windows of the ordinary size may be about one inch long and half an inch wide, besides that portion of the spring used to secure it to the bracket: A set screw may be inserted underneath the spring to adjust it when necessary. The elastic end of this spring passes under the pivot of the roller and presses the pivot upward to the top of the bearing in the bracket sufficiently hard to cause friction enough to prevent the curtain from running down or unrolling when the eyelet band is stationary.

When the band is pulled to operate the curtain the force required increases the pressure of the pivot on the spring C and relieves the pressure and friction of the pivot from the top of the bearing and allows it to revolve freely. There is space sufficient left below the spring to allow its downward motion. The small roller F at the lower part of the band B is merely to keep the band in a straight line with the upper toothed pulley. A heavy tassel may be used for the same purpose, with a similar roller in the upper part thereof around which the band may pass.

The objections to the curtain fixtures heretofore used have been, among others, the difficulty of keeping the curtain stationary at any desired point—their irregular operation, and their constant liability to get out of repair. All these difficulties are remedied by my improvement. The work is strong, simple.

The eyelet band and toothed wheel give the entire control of the curtain to the operator, and the relieving friction spring keeps the curtain stationary at any desired elevation and when any change in the position of the curtain is required the operation of the band itself, or, pulling down the curtain relieves the pressure of the friction spring, and produces an easy revolution of the roller.

I do not claim as new the tooth flanged pulley, nor the endless eyelet band, nor the friction spring, nor the roller curtain by themselves, nor any two or three of these in combination—but What I do claim as my invention and desire to secure by Letters Patent is—

5   The combination of the toothed flanged pulley A, the endless eyelet band B and the friction spring C, with the roller curtain in the manner and for the purpose as herein substantially set forth and described.

PURCHES MILES.

Witnesses:
　WM. VINE,
　H. H. BARBOUR.